No. 773,332. PATENTED OCT. 25, 1904.
D. B. MERRELL.
FERTILIZER DISTRIBUTER.
APPLICATION FILED FEB. 15, 1904.
NO MODEL. 2 SHEETS—SHEET 1.

Witnesses
Walter B. Payne
Clarence A. Bateman

Inventor
Daniel B. Merrell
by Frederick J. Church
Attorney

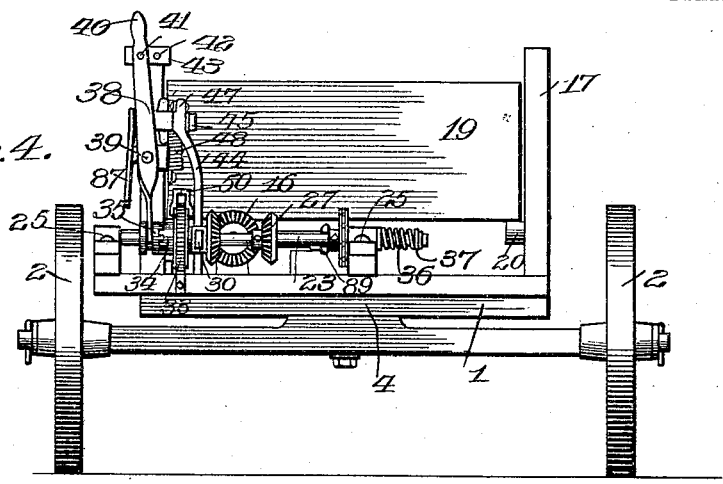

No. 773,332. Patented October 25, 1904.

UNITED STATES PATENT OFFICE.

DANIEL B. MERRELL, OF SHORTSVILLE, NEW YORK.

FERTILIZER-DISTRIBUTER.

SPECIFICATION forming part of Letters Patent No. 773,332, dated October 25, 1904.

Application filed February 15, 1904. Serial No. 193,546. (No model.)

*To all whom it may concern:*

Be it known that I, DANIEL B. MERRELL, of Shortsville, in the county of Ontario and State of New York, have invented certain new and useful Improvements in Fertilizer-Distributers; and I do hereby declare the following to be a full, clear, and exact description of the same, reference being had to the accompanying drawings, forming a part of this specification, and to the reference-numerals marked thereon.

My present invention relates to improvements in fertilizer distributers or spreaders, and more especially to that class shown and described in Letters Patent of the United States No. 419,463, granted to me January 14, 1890, and No. 448,884, also granted to me March 24, 1891; and it has for its object to provide a device of this character that is capable of thoroughly and uniformly spreading the material to be distributed over the ground or soil by discharging it radially or at a wide angle from the rear of the machine as it travels along, thereby causing the material to evenly cover a comparatively wide path.

It is also an object of my invention to provide improved mechanism for operating the movable platform or carrier by means of which the material is fed to the distributer and for reversing its motion to return it to its original position, whereby the rate of feed may be readily adjusted and the motion of the movable carrier automatically arrested when it reaches the limit of its motion in either the forward or the reverse direction.

My invention also consists in certain features of construction and arrangement that will hereinafter more fully appear, the novel features being more particularly pointed out in the claims hereunto annexed.

Figure 1:
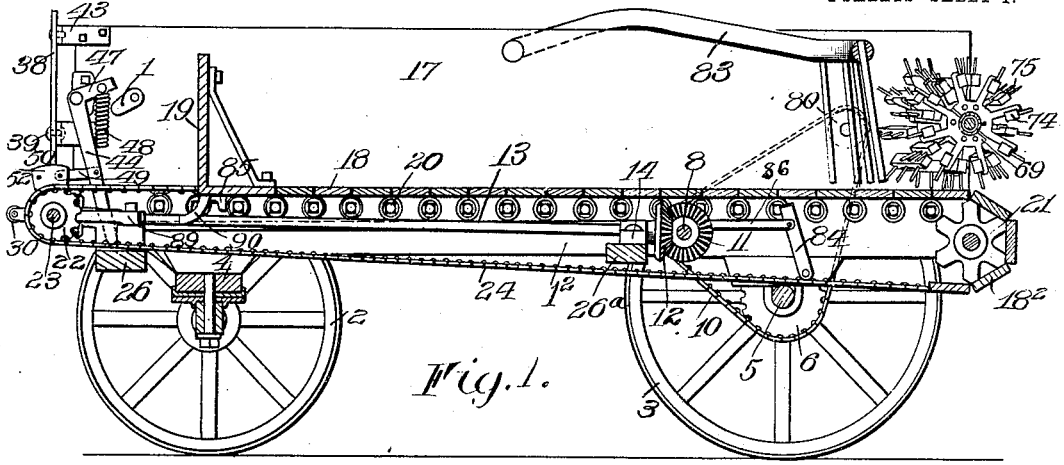
Figure 2:
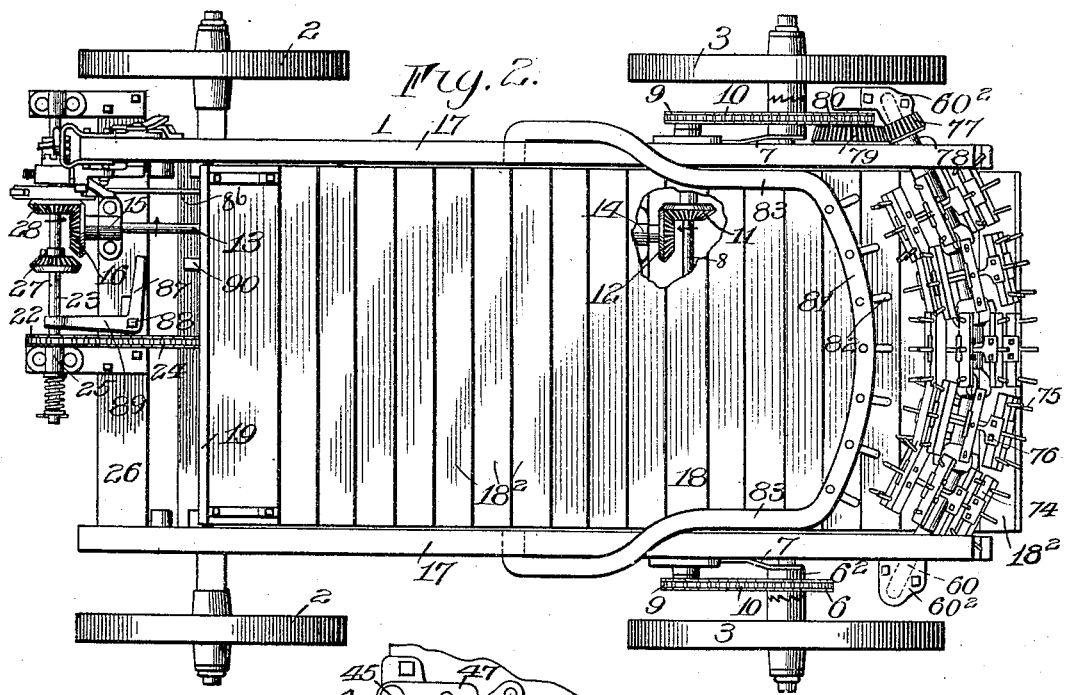
Figure 3:
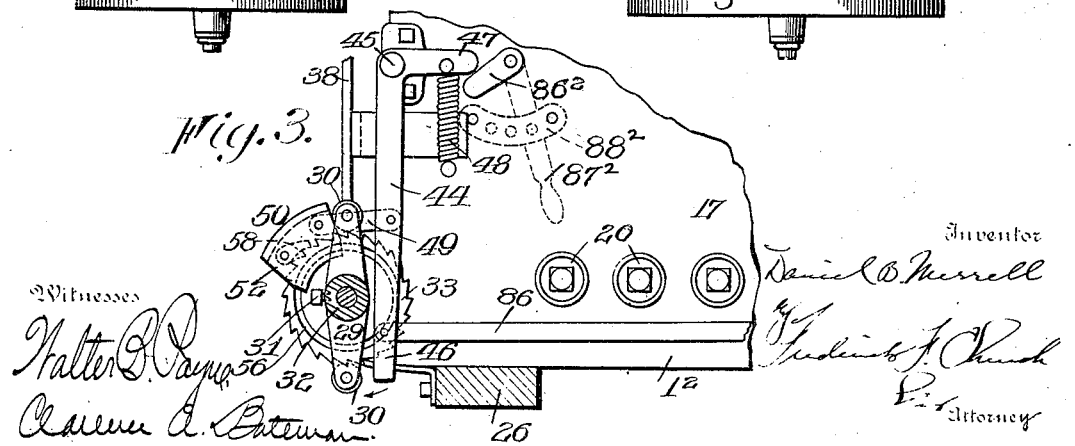

In the drawings, Figure 1 is a central longitudinal section of a distributer embodying my invention. Fig. 2 is a plan view of the same. Fig. 3 is a fragmentary sectional view showing the platform or carrier operating mechanism. Fig. 4 is a front elevation of the machine. Fig. 5 is a detail view, on an enlarged scale, showing one of the beaters in side elevation. Fig. 6 is a fragmentary view, partly in section, showing the method of connecting the beaters; and Fig. 7 is a detail sectional view of the carrier-operating mechanism.

In the views I have illustrated a fertilizer distributer or spreader embodying my invention, wherein—

1 designates the main frame, embodying the longitudinal sills $1^2$ $1^2$, mounted on the supporting-wheels 2 2 and 3 3, the forward wheels 2 2 being preferably pivoted to the bolster 4 to enable the machine to be directed in its course over the field. The rear wheels 3 3 are in the present instance mounted upon a shaft 5, upon which are loosely mounted the main driving-wheels 6 6, the surfaces of the hubs $6^2$ of each driving-wheel adjacent the supporting-wheels 3 3 being serrated to form a ratchet-clutch with the correspondingly-serrated surfaces of the hubs of the wheels 3 3, a spring 7 being provided for each clutch that will normally tend to retain it in engagement while the vehicle is moving in the forward direction, but will permit the disengagement of the clutch members when the motion is reversed. Adjacent the shaft 5 is a counter-shaft 8, mounted in the longitudinal sills $1^2$ $1^2$ and carrying sprocket-wheels 9 9 at each end thereof, that are connected by chains 10 10 to the main driving-wheel 6 6, and on this counter-shaft between these sills $1^2$ $1^2$ is also mounted a bevel-gear 11, meshing with the bevel-wheel 12, which is mounted upon a longitudidal shaft 13, that is journaled in bearings 14 15, carried by cross-pieces 26 $26^a$ on the main frame and is provided at its opposite end with a gear-wheel 16.

The sides 17 17 of the body of the machine are relatively fixed and are preferably secured rigidly to the longitudinal sills $1^2$ $1^2$ of the main frame, and between these sides extends the floor of the machine, embodying a relatively movable platform or carrier 18, made up in the present instance of a plurality of sections $18^2$, that are hinged or flexibly connected to form a movable carrier, the front board 19 of the body being also connected to and movable with this flexible floor to form a follower therefor. This floor or platform is preferably mounted so as to ride upon the antifriction-rollers 20 20, that are suitably supported between the sills, and at the rear of these end sills is provided a sprocket-wheel or roller 21, having its periphery so formed that the individual sections 18² of the floor may pass over it, and at the forward portion of the machine is provided a sprocket-wheel 22, which is mounted upon the feed-shaft 23 and is adapted to receive a chain 24, which is connected to the forward and rear extremities of the movable floor 18. This shaft 23 is mounted in bearings 25 25, supported by the cross-piece 26, and carries the oppositely-arranged bevel-gears 27 28, respectively, the gear-wheel 27 being rigidly secured to the shaft and arranged to be moved into engagement with the bevel-gear 16, carried by the longitudinal shaft 13. The gear-wheel 28 is revolubly mounted on this shaft 23 and carries an arm 29, provided at each end with the diametrically-disposed rollers 30 30, a set-screw 31 being employed to secure this arm 29 in adjusted position upon the extension 32 of the wheel 28. Adjacent this gear-wheel 28 is also provided a ratchet-wheel 33, which is loosely mounted on the shaft 23 and has a hub 34, the edge of which is serrated or provided with projections to form a clutch member to coöperate with the correspondingly-shaped clutch member 35, which is rigidly mounted on the shaft 23, a spring 36, interposed between the bearing 25 and the stop-collar 37 at the end of the shaft, being provided, the normal tendency of which is to retain the clutch members 34 and 35 in operative engagement. This clutch member 35 is adapted to be operated by the lever 38, pivotally mounted upon the pin 39 and having an operating-handle 40 at its upper end and in a convenient position to enable the attendant to manipulate the clutch, an aperture 41 being provided upon this lever and arranged to register with the aperture 42 upon the support 43 to permit the insertion of a pin that will retain this lever in the desired position.

Pivotally mounted upon the relatively stationary body of the machine is a bell-crank lever 44, supported by the pivot-pin 45 and having an arm 46, that is adapted to swing in a plane coincident with the plane of rotation of the arm 29, the other arm, 47, having attached thereto a spring 48, the opposite end of which is relatively fixed, thereby producing a force the action of which will normally tend to move the arm 46 toward the rollers 30 30 of the rotating arm 29. A link 49 is also pivotally attached to the arm 46 of this lever and is connected at its other end to the pawl-box 50, which is preferably made up of two sections 52 and 53, suitably united, each of these sections being provided with a curved groove 54 55, respectively, in which rest the annular flanges 56 57, respectively, of the ratchet-wheel 33, such a construction permitting a circumferential motion of the pawl-box in relation to the ratchet-wheel and also serving to retain these two members in their proper relation. In the pawl-box 50 are mounted one or more ratchet-pawls 58, that are so arranged as to engage the teeth of the ratchet-wheel 33 in such a manner that as motion is imparted to the former through the link 49, that is connected to the swinging arm 46, this motion in return will be imparted to the ratchet-wheel 33 to cause a rotation of the latter, and as the clutch member 35 is normally in engagement with the corresponding member 34 of the ratchet-wheel the rotary motion of the latter will be in turn imparted to the shaft 23, causing motion to be transmitted through the sprocket-wheel 22 to the chain 24 for a purpose that will hereinafter appear.

At the rear of the machine is mounted a feeder or distributer of a novel construction, the present embodiment thereof comprising a shaft 60, that is supported at its ends in bearings 60² 60² and is formed on substantially an arc of a circle that bows both rearwardly and outwardly from the rear of the machine, and for the purposes of the present construction it is preferable to form this shaft of a series of straight sections, each bending off at a predetermined angle to the next adjacent section, which combined form substantially a curve. Upon each of these straight sections is revolubly mounted a beater made up in the present instance of a bearing-sleeve 61, composed of two or more separable sections united by bolts passing through the lugs 62 of each section, and upon each of these bearing-sleeves is formed a journal 63, fitted to revolve on its corresponding straight portion of the shaft 60. Each of these sections carries a ball 64 at one end thereof, which is provided with the laterally-disposed operating projections 65, that are adapted to enter the longitudinal recesses 66, formed in the socket 67, carried by the adjacent end of the next beater, and in practice it is preferable to arrange these operating projections 65 of the ball 64 at one end of the sleeve substantially at right angles to the recesses 66, formed in the socket 67, carried by the opposite end of the same sleeve, and at the center of each section of the bearing-sleeve are provided the lateral projections 68, which form when these sections are clamped together, a flange against which the separable sections 69 70 of the beater are adapted to be clamped, bolts 71 being passed through these parts for firmly clamping them in position. These beaters are each divided into two separable members for the purpose of enabling them to be readily and conveniently clamped into position or removed, as may be desired, and they are each provided with a plurality of radially-disposed arms 72, each of which is provided with a recess 73 to receive the cross-piece 74, carrying the forks 75, one or more bolts 76 being provided for clamping these cross-pieces in position, such a construction enabling these forks to be readily removed when broken or otherwise damaged to permit a new one to be readily substituted. It is preferable to stagger the forks of one beater in relation to those of the next adjacent beater in applying them to the shaft, as such a construction will enable them to be placed closer together and still not intefere with each other in operation, as the forks will by such a construction be free to pass between each other on the inner side of the curve. These beaters are operated in the present instance by a gear-wheel 77, that is mounted on an extension 78 of the sleeve of the adjacent end beater and meshes with the gear-wheel 79, that is connected to and rotates with the sprocket-wheel 80, over which the driving-chain 10 passes, a continuous motion being thereby imparted to these beaters during the forward motion of the machine.

In operating the machine I prefer to employ a device for controlling the passage of fertilizer to the beaters, and in the present embodiment I have illustrated such a device comprising an arm 81, carrying a plurality of radially-disposed forks or teeth 82, that are arranged slantingly in a curve substantially parallel to the curve formed by the beaters and located immediately in front thereof, the arm 81 being supported by the arms 83, that are pivoted to the sides 17 of the body of the machine, such a construction permitting the forks to rise sufficiently high as to permit the fertilizer to be evenly fed rearwardly to the beaters by the movable platform 18, but at the same time preventing an excessive amount to pass it at any time.

In order to prevent the continued operation of the movable floor or carrier after the machine has been emptied, I employ an automatic stop which comprises in the present instance a pivoted lever 84, having an upwardly-projecting arm that is located in the path of motion of a projection 85, carried at the forward portion of the platform or floor, and it is so arranged that when it has been operated by the stop 85 it will cause the lever-arm 46 to be drawn back out of engagement with the rollers 30 30 through the connection 86, and as this lever 46 when it occupies such a position will be moved out of the path of the operating-rollers 30 30 its reciprocation will cease, thereby causing the motion of the shaft 23 and the sprocket-wheel 22, carried thereby, over which passes the chain 24, to discontinue. When the wagon-bottom or carrier has reached this position, the contents thereof will have been completely distributed, and in order to return the parts to their normal positions the reversing-lever 38 is shifted by the attendant so as to throw the clutch member 35 out of engagement with the corresponding number 34 and at the same time draw the bevel-gear 27, that is rigidly attached to the shaft 23, into engagement with the bevel-gear 16, and as the motion of the latter continues, due to the continued motion of the machine, it will obviously impart a reverse motion to the said shaft, causing the sprocket-wheel 22 thereon to reverse the motion of the chain 24, and consequently cause the floor or carrier to return to its normal position, when the machine is in position to receive its next load. I also employ an adjusting device whereby the relative speed with which the carrier 18 moves in relation to the speed of the machine may be regulated, and it consists in the present form in providing a movable stop $86^2$, which is adapted to coöperate with the end of the arm 47 of the lever 44 in such a manner that the return motion of the said lever, under the influence of the spring 49, will be limited to various degrees at the different positions of the stop, and as the number of teeth passed over by the pawl 58 is determined by the distance of the return motion of the arm 46 the amount of movement of the ratchet-wheel 33, and consequently the operating-chain 24, connected thereto and to the movable carrier, will be varied, thereby regulating the amount of material that is fed to the beaters. In operation I prefer to employ means whereby this stop may be readily adjusted, and in the present form I employ an operating-handle $87^2$, coöperating with a graduated segment $88^2$ in such a manner that the said handle may be securely retained in its adjusted position during the operation of the machine.

In operating a machine embodying my invention any suitable means may be employed whereby it may be caused to traverse the field, and, as it moves along, the rear wheels 3, the hubs of which are normally held in coöperative engagement with the driving-wheels 6 6 by the spring 7 7, will impart their rotary motion to the latter wheels, and the latter in turn will impart their motion to the counter-shaft 8 by means of the driving-chains 10. Assuming that the body of the machine inclosed between the sides 17 and the front board 19 and the beaters has been previously filled with the fertilizer to be distributed, it will be obvious that rotation of the counter-shaft 8 will cause a corresponding motion of the longitudinal shaft 13 through the bevel-gears 11 and 12, and the rotary motion of this shaft 13 will in turn be transmitted from the bevel-gear 16 to the corresponding wheel 28. This bevel-gear 28 is revolubly mounted on the shaft 23, and as it rotates the rollers 30 30, carried by the arm 29, that are attached to this bevel-gear 28, will be caused to move in a circular path, and in doing so they will strike successively against the arm 46 of the lever 44, causing it to be displaced rearwardly, and as this arm 46 moves rearwardly under the action of these rollers the pawl-box 50, carrying the pawl 58, that normally rests in engagement with the ratchet-wheel 33, will be drawn backwardly by the link 49, thereby causing the feed-shaft 23, which is connected to this wheel through the clutch members 34 and 35, to be rotated a predetermined amount. As each roller leaves this lever the latter will be immediately returned to its normal position under the action of the spring 48 in readiness to be actuated in a similar manner by the next succeeding roller, and during its return motion the pawl 58 will ride over a predetermined member of the ratchet-teeth. The amount of motion thus imparted to the shaft 23 may be varied by adjusting the stop $86^2$ through the manipulation of the lever $87^2$, as it will be seen that by bringing this adjustable stop $86^2$ into different positions, so as to limit the return motion of the arm 46 under the action of the spring 48, a lesser number of teeth will be traversed by the pawl 58 in its return motion, thereby decreasing the distance through which the ratchet-wheel rotates. The motion thus imparted to the shaft 23 will cause an intermittent motion of the sprocket-wheel 22 in the direction of the arrow, causing the chain 24, which is connected to the rear of the movable platform, to draw the latter rearwardly, and as the front board 19 moves, with this platform as a follower, it will cause the material thereon to be positively fed rearwardly against the forks 82, raising the latter and pressing beneath them and on to the beaters. One of the driving-chains 10 also passes over the sprocket-wheel 80, which latter communicates its motion to the gear-wheel 79, which meshes with the corresponding wheel 77, loosely mounted on the curved beater-shaft 60. As the gear-wheel 77 is connected by a sleeve 78 to the bearing-sleeve of the next adjacent beater, it will be understood that the motion thereby imparted to the latter will be transmitted successively from one beater to the other by means of the operating projections 65 of one member engaging the recesses in the socket carried by the next adjacent member. By employing a construction of this character each beater is caused to revolve on a different axis from the others, the axes of the several beaters being so arranged by the curved shaft as to form substantially an arc of the circle. Therefore as the material to be distributed is fed up to the distributer it will be immediately seized by the forks or prongs of the various beaters and by them thrown out radially in a direction both rearwardly and laterally of the machine. As the machine is drawn over the field the distribution will continue until the follower 19 has reached the forks 80 and caused the entire contents to be exhausted, at which time the projection 85 will have struck the lever 84, causing it and the link 86, connected to it, to move rearwardly, such an operation causing the arm 46 to be drawn back out of the path of the rollers 30, consequently causing the feeding operation to cease. When this has occurred, the reversing-lever 38 may be shifted so as to throw the clutch member 35 out of engagement with the corresponding member 34, and at the same time shifting the shaft 23 longitudinally against the action of the spring 36, and also bringing the bevel-gear 27 into engagement with the corresponding gear 16. Continued motion of the machine will then cause the shaft 23 to be rotated in a reverse direction, the sprocket-wheel 22 in turn reversing the motion of the chain 24 and causing the movable platform to be drawn forwardly into its normal position, when the machine is ready to be refilled for the next succeeding distribution.

In order that the return motion of the floor or platform may also be automatically arrested when it has reached its limit of motion, I provide a stop embodying in the present instance a bell-crank lever 87, pivotally mounted upon the pin 88, carried by the cross-piece 26 and having an arm 89 adapted to engage the sprocket-wheel 22 or other suitable projection upon the feed-shaft 22 to move it longitudinally, and thereby disengage the reverse-gear 27 and the gear 16, the other arm of this lever normally resting in the path of the projection 90, that is carried by the relatively movable floor or platform, whereby when the latter reaches the limit of its forward motion the said projection will strike the corresponding arm of the bell-crank lever, causing the opposite arm in turn to strike the wheel 22, and thereby move the shaft 23 longitudinally.

A machine embodying my invention enables the speed by which the material is fed to the beaters to be readily adjusted to meet the requirements of various conditions, and it also provides an automatic device that will cause this feeding operation to be discontinued at the proper moment when the material has been exhausted. It also provides an improved form of distributer in which the material is thoroughly spread both rearwardly and laterally from the machine and at the same time causing all portions of the ground within the radius of the distribution to be thoroughly and evenly covered. It also provides a convenient and simple means for reversing the motion of the moving platform and for bringing the latter to a stop when it reaches the limit of its forward motion, so that this operation may be automatically accomplished through the continued motion of the machine along the ground, thereby avoiding the necessity of performing this operation manually or by other separately operable means.

Although I have shown and described mechanism which is particularly useful and efficient for feeding the material to be distributed to the beaters, this part of my invention is not claimed in the present application, but forms the subject-matter of a divisional application, Serial No. 224,035, filed September 10, 1904.

I claim as my invention—

1. In a device of the character described, a distributer or spreader embodying a plurality of beaters operatively connected and adapted to rotate in a series of planes arranged in angular relation.

2. In a device of the character described, a spreader embodying a shaft or support bent to form approximately a curve, and a plurality of beaters mounted to rotate thereon.

3. In a device of the character described, a spreader embodying a shaft or support arranged to form approximately a curve, and a plurality of beaters revolubly mounted thereon and operatively connected with each other.

4. In a device of the character described, a spreader embodying a shaft or support having a plurality of sections disposed angularly to each other, and a beater revolubly mounted on each section and arranged to rotate in planes disposed angularly to each other.

5. In a device of the character described, a spreader embodying a shaft or support arranged in approximately the form of a curve, a plurality of beaters revolubly mounted thereon, and connections between the beaters for transmitting motion between them.

6. In a device of the character described, a spreader embodying a plurality of angularly-arranged bearing portions, a beater revolubly mounted upon each bearing, operating means for the beaters, and connections between the beaters for transmitting the power thereto from the operating means.

7. In a device of the character described, a spreader embodying a support having a plurality of bearings angularly arranged thereon, a beater revolubly mounted on each bearing, operating means for the beaters, and flexible couplings between said beaters for transmitting motion to the beaters from the operating means.

8. In a fertilizer-distributer, the combination with the body thereof, of a spreader carried thereby embodying a support bowed rearwardly from the said body, a plurality of beaters revolubly mounted thereon, operating means for the beaters, and connections between the beaters for transmitting motion thereto from the operating means.

9. In a fertilizer-distributer, the combination with the body thereof, of a spreader embodying a support having an approximately curved form, a plurality of beaters revolubly mounted thereon each having a member coöperating with a corresponding member on the adjacent beater, whereby rotation may be transmitted to all of the beaters, and operating means connected to the beaters.

10. In a fertilizer-distributer, the combination with the body thereof, of a spreader embodying a support having an approximately curved form, a plurality of beaters revolubly mounted thereon each having a bearing-sleeve fitted on the support and carrying coupling members adapted to coöperate with similar members on the adjacent beater for transmitting rotary motion between the beaters and operating means for the beaters.

11. In a fertilizer-distributer, the combination with the body thereof, of a spreader carried thereby embodying a substantially bowed shaft or support, a plurality of beaters revolubly mounted thereon each having a ball provided with operating projections coöperating with a socket on the adjacent beater, the operating projections entering recesses in the socket to form a coupling for transmitting rotary motion between the beaters, and operating means for the latter.

12. In a fertilizer-distributer, a spreader embodying a shaft or support, a plurality of beaters each having a bearing sleeve made up of sections adapted to be secured together on said support, and a ball having operating projections and adapted to be clamped within a socket formed by the separable members or sections of the adjacent beater.

13. In a fertilizer-distributer, a spreader embodying a bearing sleeve or support having a flange thereon, a disk made of separable members and secured to the said flange, a plurality of radially-disposed arms formed on said disk and provided with sockets or slots, and cross-arms fitted into the sockets of said arms and provided with radially-arranged teeth or projections.

14. In a fertilizer-distributer, the combination with the body thereof, a distributer carried thereby having a plurality of beaters arranged to form approximately a curve, and feeding devices for conveying the material to be distributed to the distributer, of a raking device embodying a pivoted frame having a plurality of prongs arranged in a curve corresponding to the configuration of the spreader, said raking device being arranged in advance of the spreader for controlling the supply of material thereto.

15. In a fertilizer-distributer, the combination with the body of the machine, a distributer carried thereby having beaters arranged to form approximately a curve, and means for feeding the material to the distributer, of a raking device embodying a frame having supporting-arms pivotally connected to the body of the machine, and a curved arm carried by the pivoted arms and provided with a plurality of radially-disposed prongs or rakes that are arranged in a curve corresponding to the curvature of the distributer.

DANIEL B. MERRELL.

Witnesses:
CARLOS P. OSGOOD,
F. L. MINK.